United States Patent
Lee et al.

(10) Patent No.: US 9,581,515 B2
(45) Date of Patent: Feb. 28, 2017

(54) OPTICAL FIBER PRESSURE SENSOR AND PRESSURE MEASURING METHOD USING THE SAME

(71) Applicant: Pukyong National University Industry-University Cooperation Foundation, Busan (KR)

(72) Inventors: Yong Wook Lee, Busan (KR); Tae Kyu Noh, Gyungsangnam-do (KR)

(73) Assignee: PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 226 days.

(21) Appl. No.: 14/680,012

(22) Filed: Apr. 6, 2015

(65) Prior Publication Data

US 2016/0245713 A1   Aug. 25, 2016

(30) Foreign Application Priority Data

Feb. 25, 2015   (KR) .......................... 10-2015-0026359

(51) Int. Cl.
| | | |
|---|---|---|
| *G01L 9/00* | (2006.01) | |
| *G01L 1/24* | (2006.01) | |
| *G01N 21/00* | (2006.01) | |
| *G01L 11/02* | (2006.01) | |
| *G02B 27/28* | (2006.01) | |
| *G02B 6/02* | (2006.01) | |

(Continued)

(52) U.S. Cl.
CPC ............ *G01L 11/025* (2013.01); *G02B 6/024* (2013.01); *G02B 6/02176* (2013.01); *G02B 27/283* (2013.01); *G01B 11/161* (2013.01)

(58) Field of Classification Search
None
See application file for complete search history.

(56) References Cited

U.S. PATENT DOCUMENTS 5,561,726 A * 10/1996 Yao ........................... G01J 4/00
                                                                    356/365
7,684,656 B2 * 3/2010 Chen .................. G01D 5/35303
                                                                      385/12

(Continued)

OTHER PUBLICATIONS

H. Y. Fu, et al., "Pressure sensor realized with polarization-maintaining photonic crystal fiber-based Sagnac interferometer", Appl. Optics. vol. 47, pp. 2835-2839, 2008.

*Primary Examiner* — Daniel S Larkin
*Assistant Examiner* — Jermaine Jenkins
(74) *Attorney, Agent, or Firm* — Revolution IP, PLLC

(57) ABSTRACT

Disclosed is an optical fiber pressure sensor including: a polarization beam splitter that splits input light from a broadband light source into two beams; a polarization controller through which vertically and horizontally polarized light coming out of the polarization beam splitter pass; a pressure chamber in which the polarization beam splitter and the polarization controller may be placed; and an optical spectrum analyzer into which vertically and horizontally polarized light passing through the polarization controller and getting out of the polarization beam splitter is introduced, wherein the pressure chamber includes a polarization-maintaining fiber and an optical fiber Bragg grating.

10 Claims, 3 Drawing Sheets

(51) Int. Cl.
*G02B 6/024* (2006.01)
*G01B 11/16* (2006.01)

(56) References Cited

U.S. PATENT DOCUMENTS

| | | | |
|---|---|---|---|
| 7,963,170 B2* | 6/2011 | Kramer | G01L 1/241 |
| | | | 73/705 |
| 2013/0230271 A1* | 9/2013 | Lee | G02B 6/00 |
| | | | 385/12 |
| 2013/0317372 A1* | 11/2013 | Eberle | A61B 5/02154 |
| | | | 600/478 |

* cited by examiner

OPTICAL FIBER PRESSURE SENSOR AND PRESSURE MEASURING METHOD USING THE SAME

CROSS-REFERENCE TO RELATED APPLICATION

This application claims priority to and the benefit of Korean Patent Application No. 2015-0026359, filed on Feb. 25, 2015, the disclosure of which is incorporated herein by reference in its entirety.

BACKGROUND OF THE INVENTION

Field of the Invention

The present invention relates to an optical fiber pressure sensor and a pressure measuring method using the same, and more particularly, to an optical fiber pressure sensor capable of measuring pressure through change in wavelength of output interference spectrum at the time of applying pressure.

Description of the Related Art

Nowadays, many sensors are used to prevent a safety accident in advance at industrial sites, and new sensors have been developed up to now. Among them, pressure sensors are used in various industrial fields. When the sensors described above are embodied using optical fibers, it is possible to make the sensors smaller and lighter than electronic sensors, and there is no influence of electromagnetic interference on them. In addition, there is an advantage that optical fiber is strong against corrosion and has a life longer than that of a general electric wire.

Particularly, in order to optically measure pressure while making the best of above advantages, polarization-maintaining fiber (PMF) can be used. The PMF is an optical fiber that maintains polarization of polarized incident light to an optical fiber output terminal as it is by inducing large birefringence to an optical fiber core. As a method of inducing birefringence to an optical fiber core, there are a method of inserting a stress rod with a different expansion rate to a part of cladding to apply stress to the core, and a method of deforming a shape of a core into an elliptical shape other than a circular shape. As types of PMF described above, there are a panda type PMF, a bow-tie type PMF, and an elliptical clad type PMF. When external environmental factors such as temperature, pressure, strain, etc. around such a PMF are changed, physical properties of the PMF are varied. Using these characteristics that the physical properties of the PMF are varied, it is possible to measure change in various physical parameters applied to the PMF.

In particular, a Sagnac birefringence interferometer based on polarization-maintaining photonic crystal fiber (PM-PCF) has a simple structure, has high sensitivity of PM-PCF physical property to change in external physical parameters, has a characteristic which does not depend on input polarization, and is insensitive to change in external temperature, and thus it is widely used as a sensor head or a demodulation filter recently.

However, the PM-PCF used as the sensor head of the optical fiber pressure sensor is expensive over ten times as compared with the PMF, and has pressure sensitivity equal to or lower than the half, which are its disadvantages. In addition, the internal structure of the PM-PCF contains the periodical arrangement of air holes, and thus fusion splicing with general optical fibers is difficult, resulting in the increase of fusion splicing loss. And the increased splicing loss disturbs the accuracy of a sensor, which is another problem.

As a related report, an optical fiber pressure sensor having a Sagnac birefringence interferometer structure formed of PM-PCF with a length of 58.4 cm was demonstrated in Appl. Optics. vol. 47, pp. 2835-2839, 2008. In the previous study, a measurement range was 0 to 0.3 MPa, and measured pressure sensitivity was about 3.42 nm/MPa.

SUMMARY OF THE INVENTION

The invention has been made to solve the problems described above, and is to provide an optical fiber pressure sensor capable of measuring change in pressure through change in output spectrum, which results from change in birefringence characteristics of PMF, when the PMF is connected in a form of polarization-diversity-loop-based Sagnac interferometer and pressure is applied to a sensor head, or the PMF.

And optical fiber pressure sensor according to an embodiment of the invention includes a polarization beam splitter (PBS) that splits input light from a broadband light source into two beams, a polarization controller that controls the state of polarization of vertically and horizontally polarized light coming out of the PBS, a pressure chamber that applies pressure to a sensor head, and an optical spectrum analyzer (OSA) that analyzes the spectra of the vertical and horizontal polarization components coming out of the PBS via the polarization controller, wherein the pressure chamber includes a PMF used as the sensor head and an optical fiber Bragg grating (FBG) used for external temperature compensation.

A pressure measuring method that uses an optical pressure sensor includes: a step in which light output from a broadband light source passes through a PBS (S10); a step in which light passing through the PBS is split into vertical polarization light and horizontal polarization light (S20); a step in which vertically polarized light and horizontally polarized light pass through a polarization controller (S30); and a step in which vertically polarized light and horizontally polarized light emerge from the PBS, generating interference spectra, and then are superposed together (S40), wherein the PBS and the polarization controller are placed in a pressure chamber, wherein the pressure chamber includes a PMF and an FBG, and wherein the wavelength of the output interference spectrum is varied according to change in pressure within the pressure chamber.

DETAILED DESCRIPTION OF THE PREFERRED EMBODIMENTS

Advantages and characteristics of the invention, and a method for achieving them will be clarified with reference to embodiments to be described later in detail with the accompanied drawings. However, the invention is not limited to embodiments disclosed hereinafter but may be embodied in various forms different from one another, merely the embodiments are provided to complete the disclosure of the invention and to allow persons skilled in the art to completely know the scope of the invention, and the invention is merely defined by the scope of Claims.

Hereinafter, an optical fiber pressure sensor according to an embodiment of the invention will be described.

Figure 1:
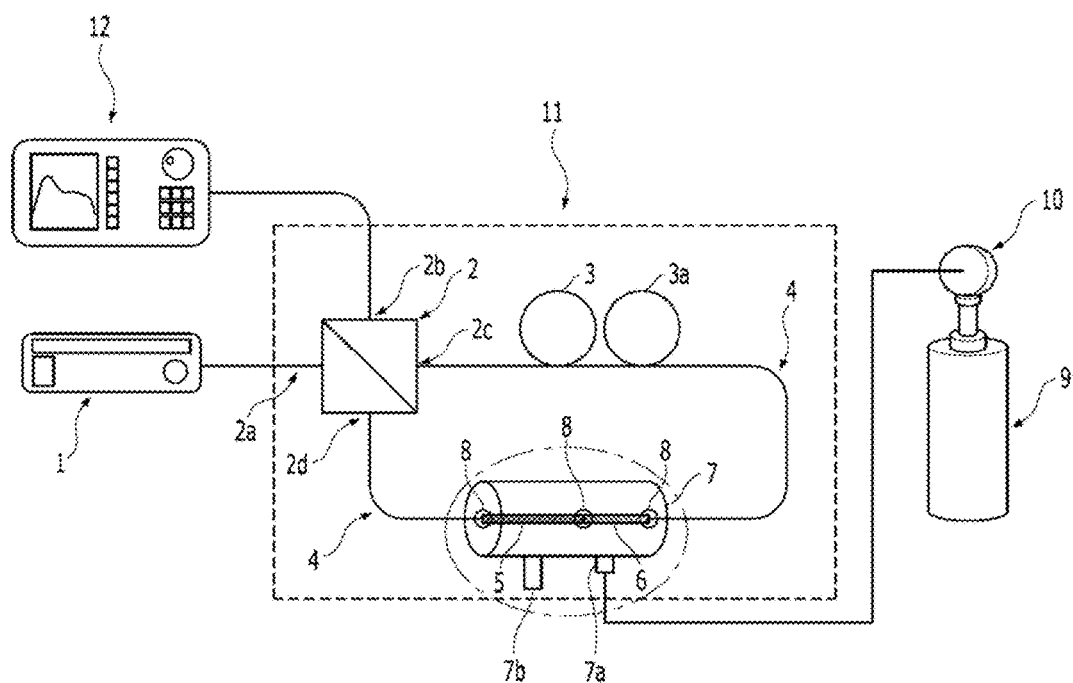
FIG. 1 is the conceptual diagram of an optical fiber pressure sensor according to an embodiment of the invention.

FIG. 1 is a diagram illustrating a configuration of an optical fiber pressure sensor according to an embodiment of the invention.

Referring to FIG. 1, a broadband light source 1 and an OSA 12 are utilized as an input source and output analyzer of a polarization-diversity-loop-based Sagnac interferometer 11, respectively. The broadband light source 1 may be a light source that outputs light including any one electromagnetic wave selected from wavelength bands of ultraviolet light, visible light, and infrared light.

The broadband light source may include any one selected from a light emitting diode, an organic light emitting diode, a solar source, a fluorescent lamp, an incandescent lamp, and a laser.

As a broadband light source used in an optical fiber pressure sensor, all types of light sources generating light (electromagnetic waves) can be used in principle. Generally, as a phenomenon of generating light, there are electroluminescence of applying electric field to a light emitting material, photoluminescence of applying ultraviolet light, blue light, green light, or the like to a fluorescent substance to generate light with a longer wavelength, cathode luminescence of colliding high-energy electrons to generate light, electron-hole recombination of recombining electrons and holes to generate light, and the like. The light output from the broadband light source 1 may have a specific range of wavelength.

The light output from the broadband light source 1 may be input to a PBS 2. The PBS 2 may split the incident light into vertical polarization light and horizontal polarization light. Vertically polarized light may get out of the vertical polarization output terminal 2d of the PBS 2. Output polarization at the vertical polarization output terminal 2d may be formed in a direction vertical to the propagation direction of incident light and vertical to the ground. On the contrary, output polarization at the horizontal polarization output terminal 2c may be formed in a direction vertical to the propagation direction of incident light and parallel to the ground. Horizontally polarized light and vertically polarized light may be formed to be orthogonal with each other.

The vertical polarization component and the horizontal polarization component pass through polarization controllers 3 and 3a, and then may be combined in the PBS 2.

The two split polarization components, or vertical and horizontal polarization components, may be introduced into the polarization controllers 3 and 3a shown in FIG. 1. The PBS 2 and the polarization controllers 3 and 3a may be positioned in a pressure chamber 7. The pressure chamber 7 may include a PMF 5 and an FBG 6. The PMF 5 may serve as a sensor head in the optical fiber pressure sensor according to an embodiment of the invention.

Generally, when stress is applied in one direction of an optical fiber core or the shape of the core is elliptical, the optical fiber has birefringence. As described above, the optical fiber having birefringence is referred to as a PMF. In addition, even in a general optical fiber, the core of the optical fiber is not completely circular in a manufacturing process, and there may be birefringence although it is small since a non-uniform stress is applied thereto.

As the PMF 5 constituting the sensor head of the polarization-diversity-loop-based Sagnac interferometer 11 according to the embodiment, a polarization-maintaining large-mode area optical fiber, a PM-PCF, and the like may be used according to whether to include stress-induced elements.

In addition, according to a structure of air holes arranged around the core to induce birefringence in a photonic crystal fiber (PCF), a PCF in which there are two or more air holes with a size different from circumference, a PCF in which air holes with a size different from circumference have a diameter of 0.1 to 50 μm, a PCF in which an interval between air holes with a size different from circumference is 0 to 20 μm, and the like may be used.

In the optical fiber pressure sensor, the FBG 6 may be installed around the PMF 5 that is the sensor head to correct a pressure measurement error caused by external temperature change. Shift directions of output transmission spectrum generated by birefringence of the PMF and peak shape reflection spectrum of the FBG are different with each other when temperature around the sensor head 5 is changed. Thus, it is possible to correct the wavelength displacement of the output transmission spectrum, induced by change in temperature, by analyzing the wavelength variation of both output transmission spectrum and grating reflection spectrum.

The single-mode fiber 4 connecting optical elements means an optical fiber having cut-off frequency capable of guiding light in a single mode. The optical fiber may play a role of connecting the PMF 5, the PBS 2, and the polarization controllers 3 and 3a to one another. According to a structure of the optical fiber 4, a single-mode fiber, a multi-mode step index fiber, a multi-mode graded-index fiber, a high numerical aperture multi-mode fiber, or the like may be used, and according to a material of the optical fiber, a silica-based fiber, a fluorine-based fiber, a rare-earth material-based fiber, a polymer-based fiber, a flint glass fiber, or the like may be used.

According to a manufacturing method of the optical fiber, a PCF, a multi-core fiber, a twisted fiber, an etched fiber, a tapered fiber, a lensed fiber, a metal-coated fiber, or the like may be used, and according to optical characteristics of the fiber, a PMF, a nonlinear fiber, a dispersion-shifted fiber, a dispersion compensation fiber, a non-zero dispersion-shifted fiber, or the like may be used.

Horizontally polarized light coming out of the horizontal polarization output terminal 2c may enter the polarization controller. The polarization controller may include a ½ wave plate 3 and a ¼ wave plate 3a. In addition to the combination of the polarization controllers shown in FIG. 1, the polarization controller may be provided in a bulk type or an optical fiber type, and may be configured by the ½ wave plate 3, the ¼ wave plate 3a, or the combination of the ½ wave plate 3 and the ¼ wave plate 3a.

The polarization controller may include a bulk-type polarization controller that uses a bulk type birefringence element and an optical fiber-type polarization controller that uses stress-induced birefringence of an optical fiber.

The polarization controllers 3 and 3a are connected to the PMF 5 or the PBS 2 through the optical fiber 4, and can control polarization states of two orthogonal polarization components split by the PBS 2.

The OSA 12 can convert an optical signal output from the polarization-diversity-loop-based Sagnac interferometer 11 into an electric signal. It is possible to analyze the optical intensity, the wavelength, and the like of the optical signals passing through the polarization-diversity-loop-based Sagnac interferometer 11 from the output signal of the OSA 12.

Figure 2:
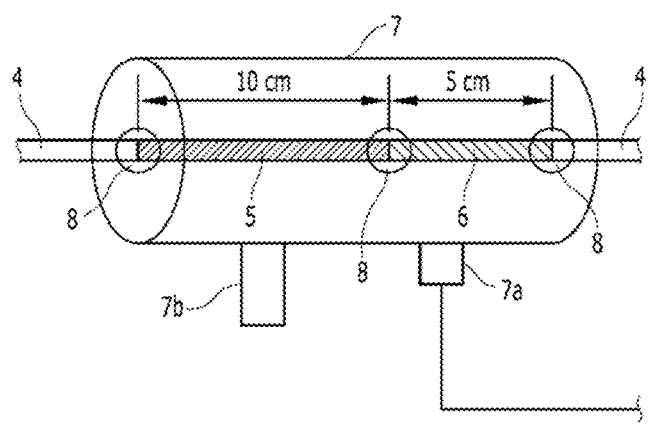
FIG. 2 is a conceptual diagram illustrating the configuration of a pressure chamber according to an embodiment of the invention.

FIG. 2 is a conceptual diagram illustrating a configuration of a pressure chamber according to an embodiment of the invention.

Referring to FIG. 2, in the pressure chamber 7, the PMF 5 that is the sensor head and the FBG 6 used for external temperature compensation are unjacketed and fusion-spliced 8 with the single-mode fiber 4, and the PMF 5 and the FBG 6 may be also fusion-spliced 8 with each other. Alternatively, the single-mode fiber 4 and the PMF 5 or the FBG 6 may be connected using at least any one method of an optical fiber patchcord or a mechanical splicer.

The pressure chamber 7 may include a gas injection hole 7a and a gas discharge hole 7b of the pressure chamber. The gas injection hole 7a may be connected to a gas controller (Mass flow controller; MFC) 10. The MFC 10 may be connected to a gas cylinder for injection 9. The injection gas 9 may include any one or more selected from hydrogen ($H_2$), nitrogen ($N_2$), oxygen ($O_2$), fluorine (F), chlorine ($Cl_2$), helium (He), neon (Ne), argon (Ar), krypton (Kr), xenon (Xe), and radon (Rn).

Hereinafter, a pressure measuring method using an optical fiber pressure sensor according to an embodiment of the invention will be described.

A pressure measuring method using an optical fiber pressure sensor according to an embodiment of the invention may include a step in which light output from a broadband light source 1 passes through a PBS 2 (S10), a step in which light passing through the PBS 2 is split into vertical polarization light and horizontal polarization light (S20), a step in which vertically polarized light and horizontally polarized light pass through polarization controllers 3 and 3a (S30), and a step in which vertically polarized light and horizontally polarized light emerge from the PBS 2, generating interference spectra, and then are superposed together (S40). The PBS 2 and the polarization controllers 3 and 3a are placed in a pressure chamber 7, and the pressure chamber 7 may include a PMF 5 and an FBG 6.

In the pressure measuring method according to an embodiment of the invention, it may become measuring the wavelength shift of the sensor output, varied according to change in pressure within the pressure chamber 7.

Figure 3:
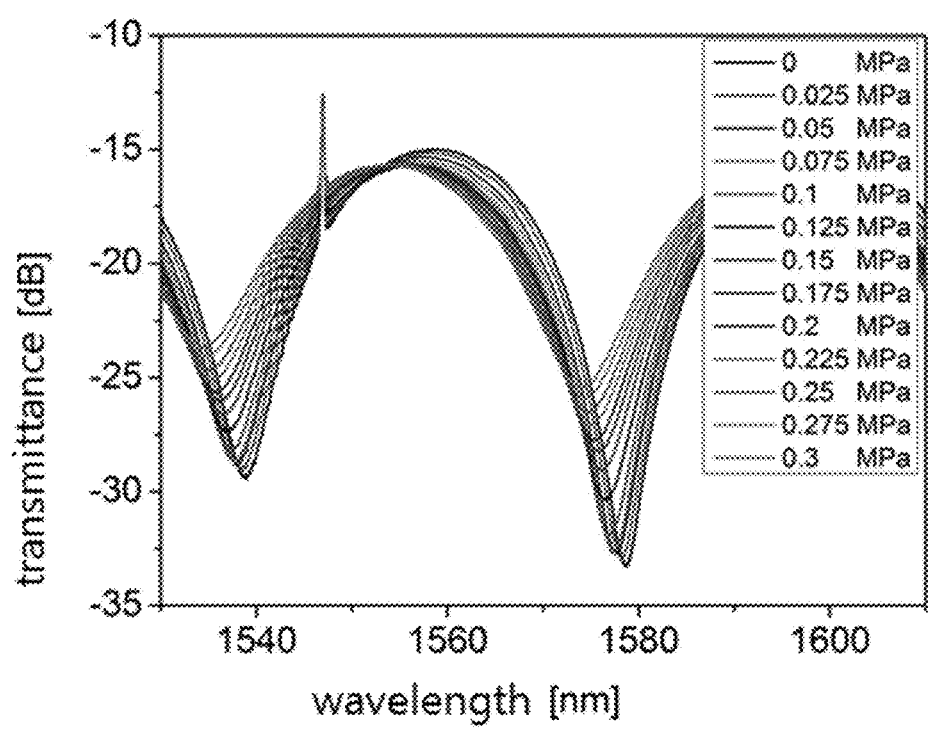
FIG. 3 is a graph illustrating output transmission spectrum measured in an optical fiber pressure sensor according to an embodiment of the invention.

FIG. 3 is a graph illustrating output transmission spectrum measured in an optical fiber pressure sensor according to an embodiment of the invention. In FIG. 3, the output transmission spectrum may be measured in the range of 1530 to 1610 nm. In addition, in FIG. 3, comb-shaped spectra in which peaks and dips are periodically repeated represent output transmission spectra based on the PMF, and a peak-shaped narrowband spectrum may represent the reflection spectrum of the FBG at a specific resonance wavelength.

Referring to FIG. 3, when pressure is applied to the PMF 5 and the FBG 6 fixed in the pressure chamber 7, birefringence of the PMF 5 is changed, and a wavelength shift may occur in the output transmission spectrum coming out of the polarization-diversity-loop-based Sagnac interferometer 11. As described above, although the wavelength shift occurs in the output transmission spectrum of the polarization-diversity-loop-based Sagnac interferometer 11, the wavelength shift may not occur in the peak-shaped spectrum reflected from the FBG 6 at a specific resonance wavelength even when pressure is applied to the FBG 6.

Since the wavelength shift may occur in the peak-shaped spectrum reflected from the FBG 6 only by change in ambient temperature, it can be used for temperature compensation in the optical fiber pressure sensor according to an embodiment of the invention.

When the change in wavelength occurring in the output spectrum of the optical fiber pressure sensor is observed and analyzed through the OSA 12 in the manner described above, it is possible to measure pressure applied from the outside.

In FIG. 3, considering the wavelength shift result measured in the polarization-diversity-loop-based Sagnac interferometer 11, it is possible to confirm that the wavelength of the output spectrum shifts to the short wavelength side as the applied pressure increases in the pressure measurement range (0 to 0.3 MPa). It can be found that the wavelength displacement of output transmission spectrum was 4.5 nm while the applied pressure increased from 0 to 0.3 MPa.

Figure 4:
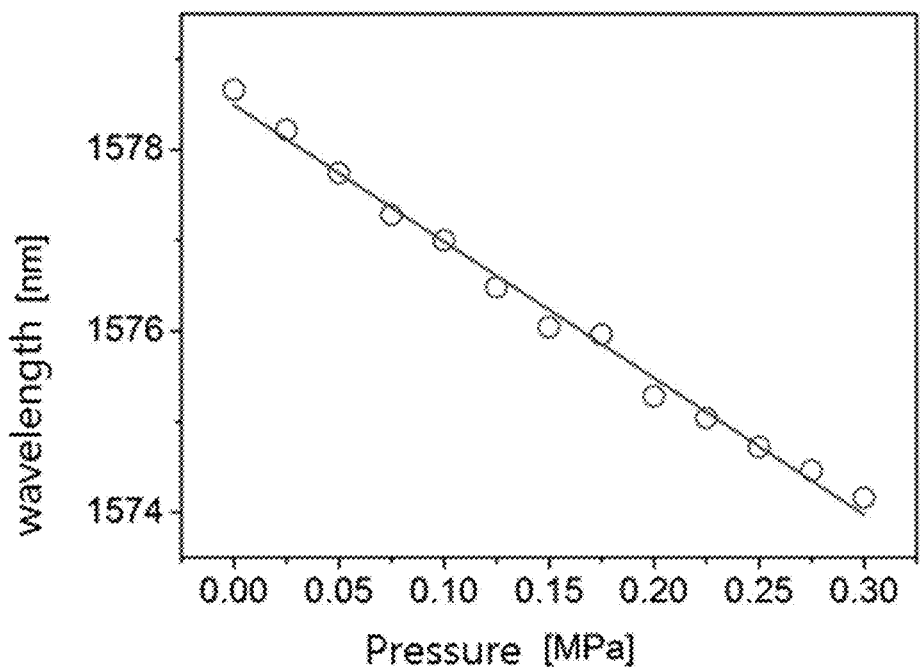
FIG. 4 is a graph illustrating the variation of the wavelength shift of a spectral dip used as a sensor indicator of an optical fiber pressure sensor according to an embodiment of the invention.

FIG. 4 is a graph illustrating the variation of the wavelength shift of a spectral dip used as a sensor indicator of an optical fiber pressure sensor according to an embodiment of the invention.

Referring to FIG. 4, if the wavelength (1578.66 nm) of the spectral dip selected as the sensor indicator is determined as a reference point when the applied pressure is 0 MPa, it is possible to know the changed wavelength of the sensor indicator when pressure within the chamber is changed.

In FIG. 4, it can be found that the indicator dip of the output transmission spectrum shifts to the short wavelength side as the applied pressure increases, and the change in wavelength of the sensor indicator with respect to the applied pressure is very linear.

It can be understood that the above description of the invention is for an example, and persons skilled in the art can easily modify the invention into other specific forms without changing technical spirit and essential characteristics of the invention. Therefore, it should be understood that the embodiments described above are examples in all respects, and are not limitative. For example, each constituent element described as a single form may be dispersedly embodied, and similarly, the constituent elements described as being dispersed may be embodied in a coupled form.

The optical fiber pressure sensor according to an embodiment of the invention has a pressure sensitivity improved about four times as compared with the existing optical fiber pressure sensor by using the PMF as a sensor head, and can correct external temperature change by positioning the FBG, of which reflection spectrum spectrally shifts by temperature change but does not by pressure change, at the side of the sensor head and using its spectral characteristics.

The advantage according to the invention is not limited to the advantage described above, and it should be understood that it includes all the advantages which can be deduced from the configuration of the invention disclosed in Detailed Description or Claims of the invention.

The scope of the invention is represented by Claims to be described later, and it should be understood that all modifications and modified embodiments deduced from the meaning, the scope, and the equivalent concept of Claims are included in the scope of the invention.

What is claimed is:

1. An optical fiber pressure sensor comprising:
   a polarization beam splitter that splits input light from a broadband light source into two beams;
   a polarization controller through which vertically and horizontally polarized light coming out of the polarization beam splitter pass;
   a pressure chamber in which the polarization beam splitter and the polarization controller may be placed; and an optical spectrum analyzer into which vertically and horizontally polarized light passing through the polarization controller and getting out of the polarization beam splitter is introduced, wherein the pressure chamber includes a polarization-maintaining fiber and an optical fiber Bragg grating.

2. The optical fiber pressure sensor according to claim 1, wherein the pressure chamber is connected to a gas controller.

3. The optical fiber pressure sensor according to claim 1, wherein the broadband light source outputs light including any one electromagnetic wave selected from wavelength bands of ultraviolet light, visible light, and infrared light.

4. The optical fiber pressure sensor according to claim 1, wherein the broadband light source includes any one selected from a light emitting diode, an organic light emitting diode, a solar source, a fluorescent lamp, an incandescent lamp, and a laser.

5. The optical fiber pressure sensor according to claim 1, wherein the polarization-maintaining fiber includes
a bow-tie type, a panda type, or an elliptical cladding type polarization-maintaining fiber, or
a polarization-maintaining photonic crystal fiber.

6. The optical fiber pressure sensor according to claim 1, wherein the gas injected to the pressure chamber includes any one or more selected from hydrogen, nitrogen, oxygen, fluorine, chlorine, helium, neon, argon, krypton, xenon, and radon.

7. The optical fiber pressure sensor according to claim 1, wherein the optical fiber connecting the polarization beam splitter, the polarization-maintaining fiber, and the polarization controller includes any one or more selected from a single-mode fiber, a multi-mode step index fiber, a multi-mode graded-index fiber, and a high numerical aperture multi-mode fiber.

8. A pressure measuring method using an optical fiber pressure sensor, comprising:
a step in which light output from a broadband light source passes through a polarization beam splitter (S10);
a step in which light passing through the polarization beam splitter is split into vertical polarization light and horizontal polarization light (S20);
a step in which vertically polarized light and horizontally polarized light pass through polarization controllers (S30); and
a step in which vertically polarized light and horizontally polarized light emerge from the polarization beam splitter, generating interference spectra, and then are superposed together (S40),
wherein the polarization beam splitter and the polarization controller may be placed in a pressure chamber,
wherein the pressure chamber includes a polarization-maintaining fiber and an optical fiber Bragg grating, and
wherein the wavelength of the output interference spectrum is varied according to change in pressure within the pressure chamber.

9. The pressure measuring method according to claim 8, wherein the change in pressure within the pressure chamber is measured by using the polarization-maintaining fiber.

10. The pressure measuring method according to claim 8, wherein a pressure measurement error of the optical fiber pressure sensor, induced by temperature change within the pressure chamber, can be corrected by using the optical fiber Bragg grating.

* * * * *